United States Patent
Bae et al.

(10) Patent No.: US 7,715,648 B2
(45) Date of Patent: May 11, 2010

(54) APPARATUS AND METHOD FOR COMPENSATING COMPRESSION BLOCKING ARTIFACTS BASED ON GRAY VALUE COMPARISONS OF ADJACENT BLOCKS

(75) Inventors: Mun Sik Bae, Gyeongsangbuk-do (KR); Woo Jin Song, Seoul (KR)

(73) Assignee: LG Electronics Inc., Seoul (KR)

( * ) Notice: Subject to any disclaimer, the term of this patent is extended or adjusted under 35 U.S.C. 154(b) by 912 days.

(21) Appl. No.: 11/330,356

(22) Filed: Jan. 12, 2006

(65) Prior Publication Data
US 2006/0159351 A1 Jul. 20, 2006

(30) Foreign Application Priority Data
Jan. 14, 2005 (KR) .................. 10-2005-0003772

(51) Int. Cl.
*G06K 9/40* (2006.01)

(52) U.S. Cl. .................. 382/268; 375/240.29

(58) Field of Classification Search ............... 382/268; 358/426.01–426.16; 348/241, 242, 425.1–425.4, 348/607; 375/240.29
See application file for complete search history.

(56) References Cited

U.S. PATENT DOCUMENTS

| | | | | | |
|---|---|---|---|---|---|
| 5,796,875 | A * | 8/1998 | Read | .................. | 382/261 |
| 5,852,682 | A * | 12/1998 | Kim | .................. | 382/268 |
| 5,974,196 | A * | 10/1999 | Chang et al. | .................. | 382/268 |
| 6,317,522 | B1 * | 11/2001 | Rackett | .................. | 382/268 |
| 6,434,275 | B1 * | 8/2002 | Fukuda et al. | .................. | 382/275 |
| 6,466,625 | B1 * | 10/2002 | Kobayashi et al. | .................. | 375/240.29 |
| 6,496,605 | B1 * | 12/2002 | Osa | .................. | 382/268 |
| 6,529,638 | B1 * | 3/2003 | Westerman | .................. | 382/275 |
| 6,539,060 | B1 * | 3/2003 | Lee et al. | .................. | 375/240.29 |
| 6,643,410 | B1 * | 11/2003 | Yu et al. | .................. | 382/268 |
| 6,728,414 | B1 * | 4/2004 | Chang et al. | .................. | 382/254 |
| 6,754,394 | B2 * | 6/2004 | Boliek et al. | .................. | 382/240 |
| 6,823,087 | B1 * | 11/2004 | Liu et al. | .................. | 382/266 |
| 7,277,592 | B1 * | 10/2007 | Lin | .................. | 382/268 |
| 7,373,014 | B1 * | 5/2008 | Mancuso et al. | .................. | 382/268 |
| 2002/0061143 | A1 * | 5/2002 | Konoshima | .................. | 382/299 |
| 2006/0034531 | A1 * | 2/2006 | Poon et al. | .................. | 382/239 |

OTHER PUBLICATIONS

Song, W-J., et al. (Aug. 1988) "Edge-preserving noise filtering based on adaptive windowing." IEEE Trans. on Circuits and Systems, vol. 35 No. 8, pp. 1048-1055.*

Park et al. (1996) "A blocking effects reduction algorithm without low-pass filtering." Signal Processing Joint Conf. on Electrical Engineering, pp. 1143-1146.*

* cited by examiner

*Primary Examiner*—Aaron W Carter
*Assistant Examiner*—Barry Drennan
(74) *Attorney, Agent, or Firm*—Birch, Stewart, Kolasch & Birch, LLP (57) ABSTRACT

An apparatus and method for compensating images in a display device is disclosed. Distortion ratios of image blocks are calculated based on a gray value difference between each of a plurality of pairs of pixels in the image blocks that face each other at a boundary between the image blocks. Compensation parameters are set based on the calculated block distortion ratios. Distortion compensation values of the image blocks are calculated based on the gray value difference and the set compensation parameters. The image blocks are then compensated according to the calculated distortion compensation values.

26 Claims, 5 Drawing Sheets

APPARATUS AND METHOD FOR COMPENSATING COMPRESSION BLOCKING ARTIFACTS BASED ON GRAY VALUE COMPARISONS OF ADJACENT BLOCKS

This application claims the benefit of the Korean Patent Application No. 10-2005-003772, filed on Jan. 14, 2005, which is hereby incorporated by reference as if fully set forth herein.

BACKGROUND OF THE INVENTION

1. Field of the Invention

The present invention relates to a display device, and more particularly, to an apparatus and method for compensating images in a display device to reduce blocking artifacts that appear in the images.

2. Discussion of the Related Art

A variety of compression techniques have been used to increase image transfer rates and storage efficiencies. Recent transform techniques widely used for image compression include Discrete Cosine Transform (DCT) and wavelet transform. The DCT technique has been used for JPEG, MPEG, and H.26X, and the wavelet transform technique has been used for JPEG2000.

In block-based image coding techniques such as JPEG and MPEG, an image is divided into blocks of a specific size and each block is individually encoded, and the image is then compressed via a quantization process and variable length coding. Image compression is performed in the quantization process in which information loss occurs. Thus, an image obtained through inverse quantization differs from the original image. At more than a certain compression rate, the block-based image coding causes blocking artifacts in the decoded image due to discontinuous luminance of blocks of the image at the boundaries between the blocks. Images compressed at a high compression rate have serious blocking artifacts, and smooth areas in the images look as if they are composed of blocks of a specific size. Blocking artifacts reduce the image quality more significantly than a loss of details in the image caused by the compression. A number of methods have been suggested to remove such blocking artifacts.

A variety of studies have been conducted to reduce blocking artifacts in the block-based transform coding. Methods for reducing blocking artifacts can be mainly divided into preprocessing and post-processing methods. The preprocessing method essentially removes blocking artifacts by removing the causes of blocking artifacts in the encoding process, and the post-processing method removes blocking artifacts from decoded images. The preprocessing method cannot be applied to coding formats such as JPEG and MPEG whose encoding and decoding procedures have been standardized. Post-processing methods can be mainly divided into filtering methods and transform coding methods. The filtering method applies low pass filtering to the block boundaries on the assumption that discontinuous portions along the block boundaries have high frequency components. Although it can reduce blocking artifacts in real time, the filtering method has a problem in that it damages edge information of the original image. In the transform coding method, transform coding is performed on an image, signal processing is performed on transform coding coefficients to remove blocking artifacts, and inverse transform coding is performed to reconstruct the image. However, it is difficult for the transform coding method to reduce blocking artifacts in real time since it requires a great deal of calculation.

SUMMARY OF THE INVENTION

Accordingly, the present invention is directed to an apparatus and method for compensating images in a display device that substantially obviates one or more problems due to limitations and disadvantages of the related art.

An object of the present invention is to provide an apparatus and method for compensating images in a display device, which removes blocking artifacts from images in real time while retaining edge information in the images.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for compensating images in a display device comprises calculating distortion ratios of image blocks based on a gray value difference between each of a plurality of pairs of pixels in the image blocks that face each other at a boundary between the image blocks; setting compensation parameters based on the calculated block distortion ratios; calculating distortion compensation values of the image blocks based on the gray value difference and the set compensation parameters; and compensating the image blocks according to the calculated distortion compensation values.

Preferably, calculating the distortion ratios of the image blocks includes forming a process window that overlaps with two adjacent image blocks; calculating a gray value difference between each of a plurality of pairs of pixels in the two image blocks that face each other at a boundary between the two image blocks and a gray value difference between each of a plurality of remaining pairs of adjacent pixels in the process window that do not face each other at the boundary between the two image blocks; and calculating a distortion ratio of the two image blocks based on both the gray value difference between each of the pairs of pixels at the boundary between the two image blocks and the gray value difference between each of the remaining pairs of adjacent pixels.

Preferably, setting the compensation parameters based on the calculated block distortion ratios includes setting a range of pixels for compensation, included in the image blocks, based on the calculated block distortion ratios; and setting a compensation proportion of each of a plurality of pixels included in the image blocks according to the calculated block distortion ratios and a distance from the boundary between the image blocks to each of the pixels.

Preferably, calculating the distortion compensation values of the image blocks based on the gray value difference and the set compensation parameters includes calculating a distortion compensation value of each pixel included in the image blocks based on the gray value difference and the set compensation parameters.

Preferably, compensating the image blocks according to the calculated distortion compensation values includes detecting pixels corresponding to an object edge and a caption portion, wherein the calculated distortion values are not applied to the pixels corresponding to the object edge and the caption portion.

In another aspect of the present invention, an apparatus for compensating images in a display device comprises a distortion detector for calculating distortion ratios of image blocks based on a gray value difference between each of a plurality of pairs of pixels in the image blocks that face each other at a boundary between the image blocks; a distortion compensator for setting compensation parameters based on the calculated block distortion ratios and calculating distortion compensation values of the image blocks based on the gray value difference and the set compensation parameters; and an image processor for applying the calculated distortion compensation values to the image blocks.

In still another aspect of the present invention, a method for compensating images in a display device comprises calculating horizontal distortion ratios of horizontally adjacent image blocks based on a gray value difference between each of a plurality of pairs of pixels in the image blocks that face each other at a boundary between the image blocks and a gray value difference between each of a plurality of remaining pairs of horizontally adjacent pixels in the image blocks that do not face each other at the boundary between the image blocks; calculating vertical distortion ratios of vertically adjacent image blocks based on a gray value difference between each of a plurality of pairs of pixels in the image blocks that face each other at a boundary between the image blocks and a gray value difference between each of a plurality of remaining pairs of vertically adjacent pixels in the image blocks that do not face each other at the boundary between the image blocks; setting horizontal compensation parameters and vertical compensation parameters based on the calculated horizontal and vertical distortion ratios; calculating distortion compensation values of the image blocks based on the gray value differences between each of the pairs of pixels at the boundaries between the image blocks and the set horizontal and vertical compensation parameters; and compensating the image blocks according to the calculated distortion compensation values.

In yet another aspect of the present invention, an apparatus for compensating images in a display device comprises a distortion detector for calculating horizontal distortion ratios of horizontally adjacent image blocks based on a gray value difference between each of a plurality of pairs of pixels in the image blocks that face each other at a boundary between the image blocks and a gray value difference between each of a plurality of remaining pairs of horizontally adjacent pixels in the image blocks that do not face each other at the boundary between the image blocks, and calculating vertical distortion ratios of vertically adjacent image blocks based on a gray value difference between each of a plurality of pairs of pixels in the image blocks that face each other at a boundary between the image blocks and a gray value difference between each of a plurality of remaining pairs of vertically adjacent pixels in the image blocks that do not face each other at the boundary between the image blocks; a distortion compensator for setting horizontal compensation parameters and vertical compensation parameters based on the calculated horizontal and vertical distortion ratios, and calculating distortion compensation values of the image blocks based on the gray value differences between each of the pairs of pixels at the boundaries between the image blocks and the set horizontal and vertical compensation parameters; and an image processor for compensating the image blocks according to the calculated distortion compensation values.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
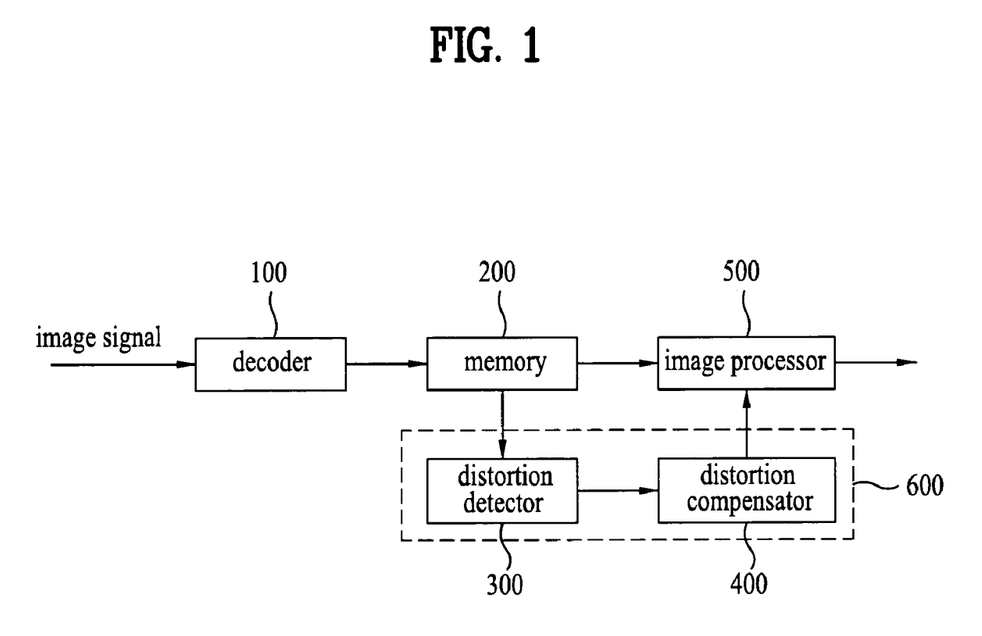
FIG. 1 is a block diagram of a display device according to the present invention.

FIG. 1 is a block diagram of a display device according to the present invention. As shown in FIG. 1, a decoder 100 in the display device receives an image signal transmitted from a broadcasting station or receives an image signal from external devices. For example, the decoder 100 receives a broadcast signal tuned by a tuner or an image signal in compressed format such as JPEG or MPEG. The received image signal is a signal that has been compressed on a per block basis. Each block is composed of 2×2, 4×4, 8×8, or 16×16 pixels. The decoder 100 decodes and transmits the received image signal to a memory 200.

A controller 600 according to the present invention includes a distortion detector 300 and a distortion compensator 400. The distortion detector 300 receives the image signal stored in the memory 200 and calculates block distortion ratios of the image signal based on both the difference between energies (specifically, gray values) of two adjacent pixels in two blocks in the image signal, which face each other across the boundary between the two blocks, and the average of differences between energies of other adjacent pixels in the two blocks that do not face each other across the boundary between the two blocks. In this calculation procedure, the distortion detector 300 calculates block distortion ratios in the horizontal direction (hereinafter also referred to as horizontal block distortion ratios) and block distortion ratios in the vertical direction (hereinafter also referred to as a vertical block distortion ratio) of the image signal. Based on the calculated block distortion ratios, the distortion detector 300 determines the degree (or proportion) of block distortion due to blocking artifacts that are caused in the procedure for decoding the image signal.

The distortion compensator 400 calculates first scale factors using the calculated block ratios. The first scale factors are used to determine compensation parameters, such as the degree (or proportion) of dissipation (or compensation) and the range of dissipation, in the procedure for compensating for block distortion of the image signal. The distortion compensator 400 may also calculate second scale factors in order to detect areas such as object edges or caption portions that exhibit sharp image variations.

The distortion compensator 400 compensates for block distortion of the image signal using the first and second scale factors and the difference Q between the gray values of two adjacent pixels in two blocks that face each other across the boundary between the two blocks. Specifically, a value obtained by substituting the gray value difference Q into a dissipating function is multiplied by the first and second scale factors. The multiplied value is added to the image signal to compensate for the block distortion. The distortion compensator 400 performs the calculation using the dissipating function for each of the vertical and horizontal directions. The dissipating function's values for the pixels in the block differ from each other. That is, the distortion compensator 400 adds different compensation values to the pixels.

If no block distortion is present in the image signal, an image processor 500 in the display device receives and outputs the image signal from the memory 200. On the contrary, if block distortion is present in the image signal, the image processor 500 outputs the image signal after adding the compensation values received from the distortion compensator 400 to the image signal.

A method for compensating image signals according to the present invention will now be described in detail with reference to FIG. 2.

Figure 2:
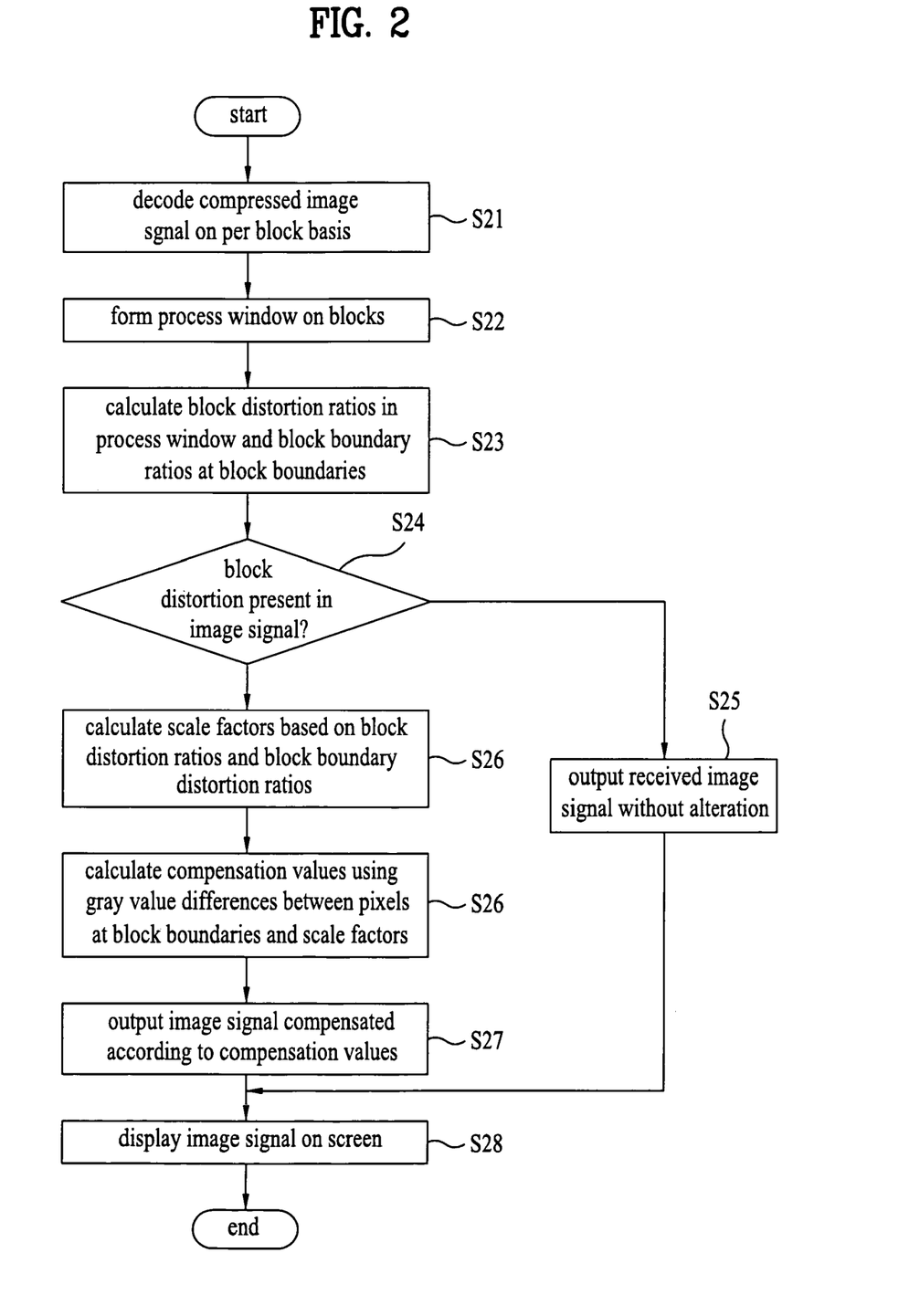
FIG. 2 is a flow chart of an image compensation method according to the present invention.

As shown in FIG. 2, when an image signal is received by the display device, the decoder 100 decodes the received image signal (S21). Here, the image signal is decoded on a per block basis since it is a signal that has been compressed on a per block basis. The decoded image signal is stored in the memory 200.

Figure 3A:
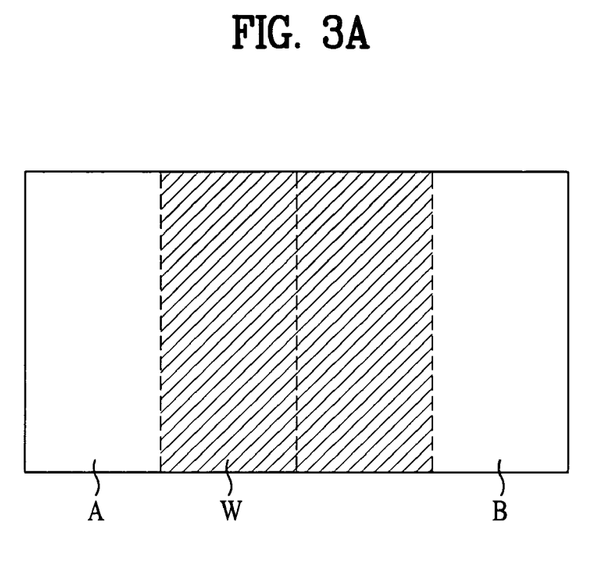
FIGS. 3A and 3B show horizontal and vertical process windows used in the present invention.
Figure 3B:
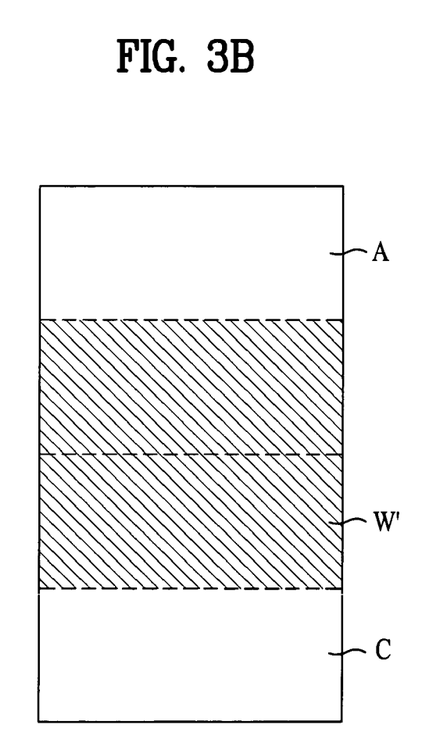

The distortion detector 300 reads the block-based image signal stored in the memory 200 and forms a virtual process window on each pair of adjacent blocks in the image signal (S22). FIGS. 3A and 3B show a horizontal process window W and a vertical process window W', respectively. The horizontal process window W is located to overlap with two horizontally adjacent blocks A and B, and the vertical process window W' is located to overlap with two vertically adjacent blocks A and C. Preferably, the center of the process window is located exactly at the boundary between the two blocks. Although the size of the process window or the number of pixels included in the process window may vary, the present invention suggests a process window that includes half of the pixels of one of the two adjacent image blocks and half of the pixels of the other.

Then, in order to determine whether or not each block of the image signal has been distorted, the distortion detector 300 calculates horizontal and vertical block distortion ratios $D_h$ and $D_v$ (or process window block distortion ratios) of pairs of blocks corresponding to the horizontal or vertical process windows W and W' and block boundary distortion ratios $D_p$ of the blocks that are distortion ratios at the boundaries of the blocks (S23). The horizontal block distortion ratio $D_h$ is a block distortion ratio of the two horizontally adjacent blocks A and A' and the vertical block distortion ratio $D_v$ is a block distortion ratio of the two vertically adjacent blocks B and B'.

The following are equations for calculating the horizontal and vertical block distortion ratios $D_h$ and $D_v$ of the entirety of the image.

$$D_h = \frac{1}{M\left(\frac{N}{n}-1\right)} \sum_{i=0}^{M-1} \sum_{j=0}^{\frac{N}{n}-2} \frac{E_h(i, n\cdot j + n - 1)}{\frac{1}{n-1} \times \sum_{k=0}^{n-2} E_h\left(i, n\cdot j + \frac{n}{2} + k\right)} \quad \text{[Equation 1]}$$

$$D_v = \frac{1}{M\left(\frac{N}{n}-1\right)} \sum_{i=0}^{M-1} \sum_{j=0}^{\frac{N}{n}-2} \frac{E_v(n\cdot i + n - 1, j)}{\frac{1}{n-1} \times \sum_{k=0}^{n-2} E_v\left(n\cdot i + \frac{n}{2} + k, j\right)} \quad \text{[Equation 2]}$$

Here, "M" denotes the total number of pixels in the image in the horizontal direction, "N" denotes the total number of pixels in the image in the vertical direction, and "n" denotes the number of pixels in a block in each of the horizontal and vertical directions. "E" denotes the absolute difference between gray values of two adjacent pixels, which is expressed by the following equation.

$E(i,j)=f(i,j+1)-f(i,j)$, where "f" denotes the gray value of a pixel.

In Equation 1, "$E_h(i,n\cdot j+n-1)$" denotes the difference between gray values of two adjacent pixels in two blocks, which face each other horizontally across the boundary between the two blocks, and $$\text{``} \frac{1}{n-1} \times \sum_{k=0}^{n-2} E_h\left(i, n\cdot j + \frac{n}{2} + k\right) \text{''}$$

denotes the average of differences between gray values of pairs of adjacent pixels in the two blocks other than the two adjacent pixels that face each other horizontally across the boundary between the two blocks. The gray value difference $E_h(i,n\cdot j+n-1)$ and the average difference $$\frac{1}{n-1} \times \sum_{k=0}^{n-2} E_h\left(i, n\cdot j + \frac{n}{2} + k\right)$$

are required to obtain the horizontal block distortion ratio $D_h$.

The block distortion ratio has the following characteristics. The block distortion ratio is minimized when the absolute difference between the gray values of the two adjacent pixels at the boundary between the two blocks is zero. This occurs very rarely, for example, when artifacts are included in the image. The block distortion ratio is maximized when the average difference between the gray values of the pairs of adjacent pixels in the two blocks, other than the two adjacent pixels at the boundary between the two blocks, is zero. That is, the block distortion ratio increases as the gray value difference between the two adjacent pixels at the boundary between the two blocks increases and the average gray value difference between the pairs of adjacent pixels in the two blocks, other than the two adjacent pixels at the boundary, decreases. Another characteristic of the block distortion ratio is that the block distortion ratio of a normal image without block distortion can be estimated based on every three pixels arranged horizontally since the pixels of the image are very similar to each other. Thus, the distortion detector 300 can determine whether or not the image signal has been distorted, based on the calculated block distortion ratios (S24).

Figure 4:
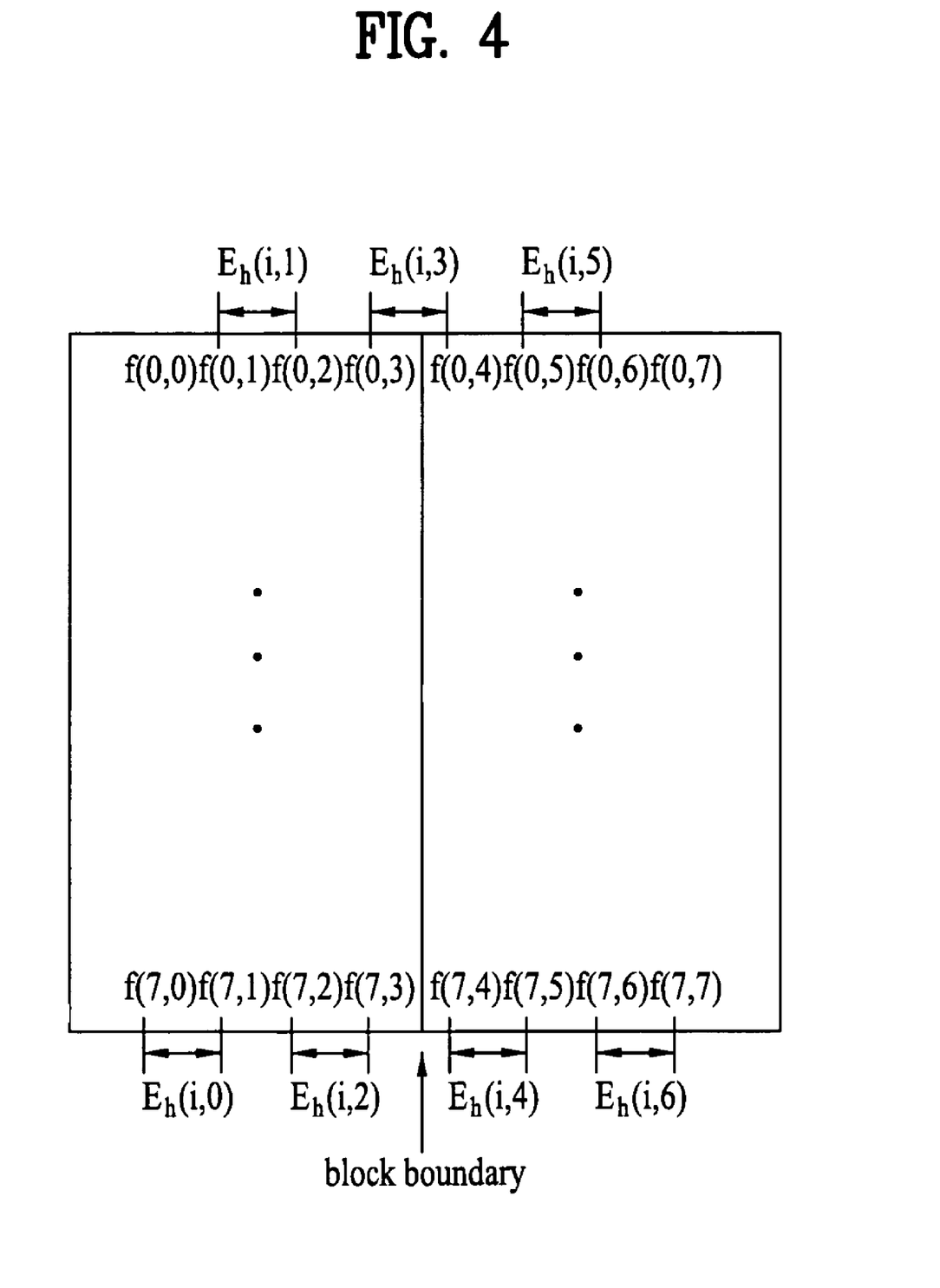
FIG. 4 shows a detailed example of a process window used in the present invention.

FIG. 4 shows an example of a horizontal process window that overlaps with two blocks, each having 8×8 pixels. Using Equation 1, a horizontal block distortion ratio $D_h$ Of the horizontal process window W of FIG. 4 can be expressed as follows.

$$D_h = \frac{1}{8}\sum_{i=0}^{7} \frac{E_h(i,3)}{\frac{1}{6}\times \sum_{k=0,k\neq 3}^{6} E_h(i,k)} \quad [\text{Equation 3}]$$

A horizontal block boundary distortion ratio $D_{p-h}$ at the boundary between the two blocks in the i-th row of the two blocks can be expressed as follows.

$$D_{p-h}(i) = \frac{E_h(i,3)}{\frac{1}{6}\times \sum_{k=0,k\neq 3}^{6} E_h(i,k)} \quad [\text{Equation 4}]$$

The following scale factors can be defined by applying the block distortion ratio and the block boundary distortion ratio to a sigmoid function.

$$\alpha_h(D_h) = \frac{1}{1+\exp(-a\cdot v)}, \text{ where } v = D_h - TH_d$$

$$\alpha_{p-h}(D_{p-h}) = \frac{1}{1+\exp(-a\cdot v)}, \text{ where } v = D_{p-h} - TH_d$$

Here, "$\alpha_h$" denotes a block distortion scale factor of the horizontal process window W, and "$TH_d$" denotes a value to move an activation point of the scale factor $\pi_h$. In addition, "$\pi_{p-h}$" denotes a block distortion scale factor of two adjacent pixels at the boundary between the two blocks, and "$TH_d$" corresponding to the scale factor $\alpha_{p-h}$ denotes a value to move an activation point of the scale factor $\alpha_{p-h}$ to the right. Each of the scale factors $\alpha_h$ and $\alpha_{p-h}$ has a value varying in the range of 0 to 1 depending on the block distortion ratio. The higher the block distortion ratio is, the nearer the values of the scale factors $\alpha_h$ and $\alpha_{p-h}$ are to 1, and the lower the block distortion ratio is, the nearer the values of the scale factors $\alpha_h$ and $\alpha_{p-h}$ are to 0. Compensation values for removing block distortion from pixels on the left and right sides of the boundary can be obtained by multiplying a dissipating function defined using these characteristics by the scale factors $\alpha_h$ and $\alpha_{p-h}$, which are referred to as first scale factors. The compensation values for compensating for block distortion significantly vary depending on the first scale factors $\alpha_h$ and $\alpha_{p-h}$.

When the block distortion is significant, the compensation values are applied to four pixels on the left of the boundary and four pixels on the right thereof. When the block distortion is not significant, the compensation values are applied to one or two pixels on the left of the boundary and one or two pixels on the right thereof. The degree (or proportion) of compensation of each of the pixels in the process window and the number of pixels for compensation (or an activation point for compensation) are determined based on the first scale factors. Normal images with few or no blocking artifacts have a low block distortion ratio, and images with more blocking artifacts have a higher block distortion ratio. Accordingly, the distortion compensator 400 appropriately sets the activation point of the scale factors $\alpha_h$ and $\alpha_{p-h}$ by appropriately setting the TH values.

The distortion detector 300 may erroneously determine that block distortion is present in an object edge or a caption portion that exhibits sharp pixel value variations. In this case, the compensation values are also applied to the object edge or caption portion, thereby damaging the image. In order to prevent this erroneous determination, the distortion detector 300 compares the absolute difference $E_h$ between the gray values of the two adjacent pixels with a threshold value and detects an object edge or a caption portion based on the comparison. A second scale factor indicating an object edge or a caption portion can be expressed as follows.

$$\beta_e(E_h(i,3)) = \frac{1}{1+\exp(-a\cdot v)}, \text{ where } v = E_h(i,3) - TH_e$$

Specifically, the second scale factor can indicate the position of an object edge or a caption portion.

The distortion detector 300 forms horizontal process windows for the entirety of the image and calculates horizontal block distortion ratios for the entirety of the image.

When the horizontal block distortion ratios $D_h$, the horizontal block boundary distortion ratios $D_{p-h}$, and the corresponding scale factors $\alpha_h$, $\alpha_{p-h}$, and $\beta_e$ have been calculated for the entirety of the image signal as described above, the distortion detector 300 calculates vertical block distortion ratios $D_v$, vertical block boundary distortion ratios $D_{p-v}$, and corresponding scale factors $\alpha_v$, $\alpha_{p-v}$, and $\beta_e$ for the entirety of the image signal in the same manner as described above. The procedure for obtaining the horizontal block distortion ratios and the procedure for obtaining the vertical block distortion ratios can be performed in the reverse order or simultaneously.

The distortion detector 300 then calculates the differences between gray values of pairs of pixels in two horizontally adjacent blocks that face each other across the boundary between the two blocks in the process window. The difference between the gray values of the two pixels at the boundary is denoted by "$Q_h$". The gray value difference $Q_h$ differs from the absolute gray value difference $E_h$ in that it may have negative and positive values. The gray value difference $Q_h$ is expressed as follows.

$$Q_h(i,8n) = u(i,8n) - u(i,8n-1)$$

The following is an example that applies the $Q_h$ values to four pixels on the left of the boundary between the two blocks and four pixels on the right thereof.

$$v(i, 8n-4) = u(i, 8n-4) + \frac{1}{2^4}Q(i, 8n)$$

$$v(i, 8n-3) = u(i, 8n-3) + \frac{1}{2^3}Q(i, 8n)$$

$$v(i, 8n-2) = u(i, 8n-2) + \frac{1}{2^2}Q(i, 8n)$$

$$v(i, 8n-1) = u(i, 8n-1) + \frac{1}{2^1}Q(i, 8n)$$

$$v(i, 8n) = u(i, 8n) - \frac{1}{2^1}Q(i, 8n)$$

$$v(i, 8n+1) = u(i, 8n+1) - \frac{1}{2^2}Q(i, 8n)$$

-continued $$v(i, 8n+2) = u(i, 8n+2) - \frac{1}{2^3} Q(i, 8n)$$

$$v(i, 8n+3) = u(i, 8n+3) - \frac{1}{2^4} Q(i, 8n)$$

These equations can be expressed by the following equation.

$$v(i, 8j+n) = u(i, 8j+n) + (-1)^p \cdot Q(i, 8j) \cdot \frac{1}{2^{|k|}}$$

Here, "u" denotes an input image block and "v" denotes an image block from which block distortion has been removed. As the variable "n" varies from −4 to 3, the pixel value difference $Q_h$ at the boundary is dissipated into the four pixels on the left of the boundary and the four pixels on the right thereof. The variable "k" varies depending on the variable "n" and the polarity (+ or −) of the variable "p" is determined based on whether a corresponding pixel is on the right or left of the boundary between the blocks. The term $$"(-1)^p \cdot Q(i, 8j) \cdot \frac{1}{2^{|k|}}"$$

in the above equation is referred to as a dissipative blocking artifact function.

The distortion compensator 400 multiplies the dissipative blocking artifact function by the scale factors $\alpha_h$, $\alpha_{p-h}$, and $\beta_e$ to calculate a compensation value for compensating for horizontal block distortion (S27). The distortion compensator 400 then outputs the calculated compensation value to the image processor 500 (S28). The image processor 500 then compensates the received image signal for the block distortion using the calculated compensation value. An image signal v output from the image processor 500 is expressed as follows.

$$v(i, 8j+n) = u(i, 8j+n) + \left[(-1)^p \cdot Q(i, 8j) \cdot \frac{1}{2^{|k|}}\right] \cdot \alpha_{p-h} \cdot \alpha_h \cdot \beta_e$$

$$k = \begin{pmatrix} |n| & \text{if } n < 0 \\ n+1 & \text{if } n \geq 0 \end{pmatrix},$$

$$p = \begin{pmatrix} 0 & \text{if } n < 0 \\ 1 & \text{if } n \geq 0 \end{pmatrix}.$$

Figure 5:
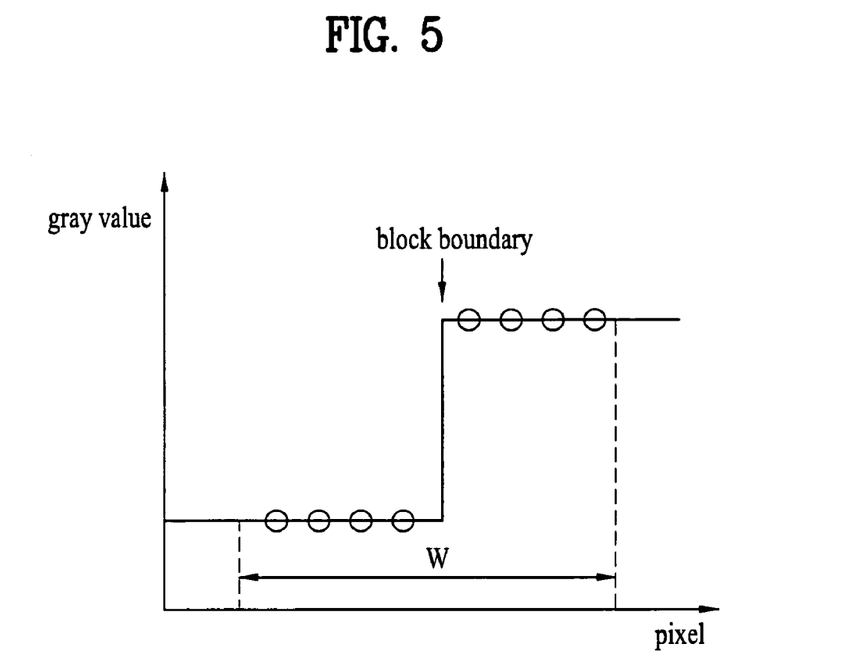
FIG. 5 shows gray values of pixels in a process window before compensating for block distortion.
Figure 6:
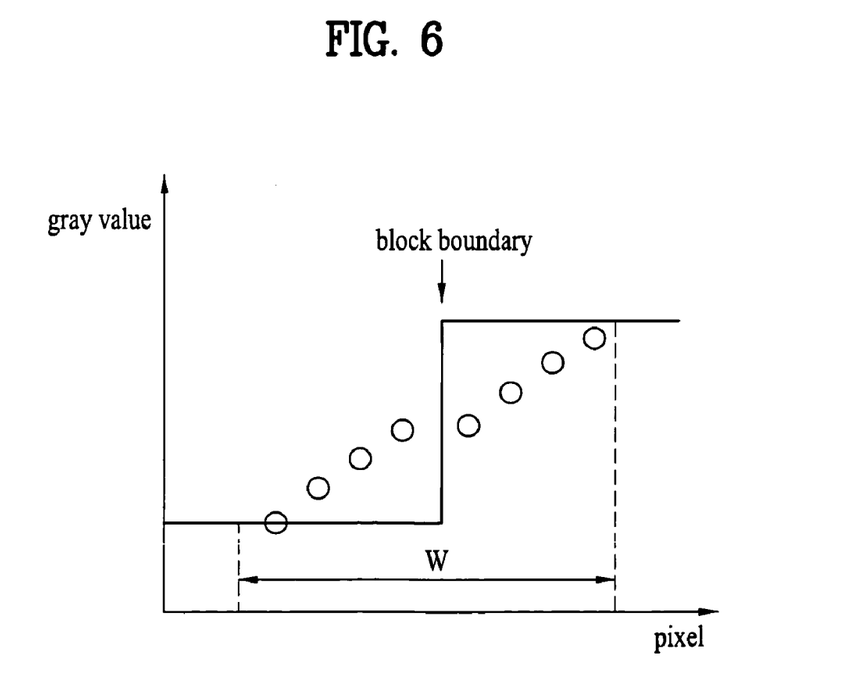
FIG. 6 shows gray values of pixels in the process window after compensating for block distortion.

FIG. 5 shows gray values of pixels in a horizontal process window before compensating for block distortion, and FIG. 6 shows gray values of pixels in the horizontal process window after compensating for block distortion. It can be seen from FIGS. 5 and 6 that the differences between the gray values of pixels in the two blocks are great before the block distortion is compensated for and the gray value differences between the pixels are reduced after the block distortion is compensated for.

The compensation values applied to the pixels on the left and right of the boundary between the blocks are automatically changed according to the degree of block distortion, and the range of pixels, to which the compensation values are to be applied, is also changed. For example, an image signal with small block distortion is compensated only a little since small compensation values are applied to pixels of the image signal. The compensation values applied to the pixels also vary depending on the positions of the pixels. For example, compensation values applied to pixels near the block boundary are greater than compensation values applied to pixels distant from the block boundary. When the boundary between the blocks corresponds to an edge such as an object outline or a caption portion, no compensation values are applied to the pixels on the left and right of the boundary since the scale factor $\beta_e$ is zero.

After the procedure for compensating for the horizontal block distortion is performed in the above manner, the procedure for compensation for the vertical block distortion is performed in the same manner. The order of the procedures for compensating for horizontal and vertical block distortions may be reversed as described above.

The method for compensating for vertical block distortion is performed in the following manner.

The differences between pairs of adjacent pixels in two vertically adjacent blocks that face each other across the boundary of the two blocks in the vertical process window W' are calculated using the following equation.

$$Q_v(8m, j) = u(8m, j) - u(8m-1, j)$$

The distortion compensator 400 then multiplies the dissipative blocking artifact function by scale factors $\alpha_v$, $\alpha_{p-v}$, and $\beta_e$ to calculate a compensation value for compensating for vertical block distortion. An image signal v that has been compensated for the vertical block distortion is expressed as follows.

$$v(8i+n, j) = u(8i+n, j) + \left[(-1)^p \cdot Q(8i, j) \cdot \frac{1}{2^{|k|}}\right] \cdot \alpha_{p-v} \cdot \alpha_v \cdot \beta_e$$

$$k = \begin{pmatrix} |n| & \text{if } n < 0 \\ n+1 & \text{if } n \geq 0 \end{pmatrix},$$

$$p = \begin{pmatrix} 0 & \text{if } n < 0 \\ 1 & \text{if } n \geq 0 \end{pmatrix}$$

When the horizontal and vertical block distortions have been removed in this manner, the display device according to the present invention can display normal images without block distortion on the screen (S29).

As is apparent from the above description, an apparatus and method for compensating images in a display device according to the present invention detects block distortion occurring in the decoding procedure and determines the degree of the block distortion. Pixels in a block are compensated according to the degree of block distortion of the pixels. Specifically, in the procedure for compensating the pixels, different compensation values are applied to the pixels depending on the positions of the pixels using scale factors, and the range of pixels for compensation is set based on the degree of block distortion.

A scale factor for detecting object outlines and caption portions is additionally used to prevent an erroneous determination that block distortion is present in object outlines and caption portions. Display devices, to which the compensation method according to the present invention is applied, can very efficiently remove block distortion from images.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for compensating images in a display device, the method comprising:
   decoding an incoming image signal with a decoder;
   storing the decoded image signal in a memory as image blocks; and
   processing the stored image blocks with a processor, the step of processing including forming a process window that overlaps with two adjacent image blocks,
      calculating distortion ratios of image blocks based on a gray value difference between each of a plurality of pairs of pixels in the process window that face each other at a boundary between the two adjacent image blocks and the average of differences between gray values of other adjacent pixels in the process window that do not face each other at the boundary between the two adjacent image blocks,
      setting compensation parameters based on the calculated block distortion ratios, and
      calculating distortion compensation values of the two adjacent image blocks by multiplying a specific value and the set compensation parameters, the specific value obtained by substituting the gray value difference into a dissipation function; and
   compensating the two adjacent image blocks according to the calculated distortion compensation values.

2. The method according to claim 1, wherein the step of setting the compensation parameters based on the calculated block distortion ratios includes:
   setting a range of pixels for compensation, included in the two adjacent image blocks, based on the calculated block distortion ratios.

3. The method according to claim 1, wherein the step of setting the compensation parameters based on the calculated block distortion ratios includes:
   setting a compensation proportion of each of a plurality of pixels included in the two adjacent image blocks according to the calculated block distortion ratios and a distance from the boundary between the two adjacent image blocks to each of the pixels.

4. The method according to claim 1, wherein the step of calculating the distortion compensation values of the two adjacent image blocks based on the gray value difference and the set compensation parameters includes:
   calculating a distortion compensation value of each pixel included in the two adjacent image blocks based on the gray value difference and the set compensation parameters.

5. The method according to claim 1, wherein the step of compensating the two adjacent image blocks according to the calculated distortion compensation values includes:
   adjusting a gray value of each pixel included in the two adjacent image blocks according to the calculated distortion compensation values.

6. The method according to claim 1, wherein the step of compensating the two adjacent image blocks according to the calculated distortion compensation values includes:
   detecting pixels corresponding to an object edge and a caption portion,
   wherein the calculated distortion values are not applied to the pixels corresponding to the object edge and the caption portion.

7. The method according to claim 6, wherein the step of detecting the pixels corresponding to the object edge and the caption portion includes:
   comparing a gray value difference between each pair of adjacent pixels in the two adjacent image blocks with a threshold value to determine whether or not the pixels correspond to an object edge and a caption portion.

8. An apparatus for compensating images in a display device, the apparatus comprising:
   a decoder configured to decode an incoming image signal;
   a memory connected to the decoder and arranged to store the decoded image signal as image blocks;
   a distortion detector connected to the memory and configured to form a process window that overlaps with two adjacent image blocks, and to calculate distortion ratios of two adjacent image blocks based on a gray value difference between each of a plurality of pairs of pixels in the process window that face each other at a boundary between the two adjacent image blocks and based on the average of differences between gray values of other adjacent pixels in the process window that do not face each other at the boundary between the two adjacent image blocks;
   a distortion compensator connected to the distortion detector and configured to set compensation parameters based on the calculated block distortion ratios and to calculate distortion compensation values of the two adjacent image blocks by multiplying a specific value by the set compensation parameters, the specific value obtained by substituting the gray value difference into a dissipation function; and
   an image processor connected to the memory and the distortion compensator, the image processor configured to process the stored decoded image signal by applying the calculated distortion compensation values to the two adjacent image blocks.

9. The apparatus according to claim 8, wherein the distortion compensator is configured to set a range of pixels for compensation, included in the two adjacent image blocks, based on the calculated block distortion ratios.

10. The apparatus according to claim 8, wherein the distortion compensator is configured to set a compensation proportion of each of a plurality of pixels included in the two adjacent image blocks according to the calculated block distortion ratios and a distance from the boundary between the two adjacent image blocks to each of the pixels.

11. The apparatus according to claim 8, wherein the distortion compensator is configured to calculate a distortion compensation value of each pixel included in the two adjacent image blocks based on the gray value difference and the set compensation parameters.

12. The apparatus according to claim 8, wherein the image processor is configured to adjust a gray value of each pixel included in the two adjacent image blocks according to the calculated distortion compensation values.

13. The apparatus according to claim 8, wherein the distortion compensator is configured to detect pixels corresponding to an object edge and a caption portion, and to not output the calculated distortion values for the pixels corresponding to the object edge and the caption portion.

14. The apparatus according to claim 13, wherein the distortion compensator is configured to compare a gray value difference between each pair of adjacent pixels in the two adjacent image blocks with a threshold value to determine whether or not the pixels correspond to an object edge and a caption portion.

15. A method for compensating images in a display device, the method comprising:
  decoding an incoming image signal with a decoder;
  storing the decoded image signal in a memory as image blocks; and
  processing the stored image blocks with a processor, the step of processing including forming a process window that overlaps with at least a subset of the image blocks, calculating horizontal distortion ratios of horizontally adjacent image blocks based on a gray value difference between each of a plurality of pairs of pixels in the process window that face each other at a boundary between the horizontally adjacent image blocks and a gray value difference between each of a plurality of remaining pairs of horizontally adjacent pixels in the process window that do not face each other at the boundary between the horizontally adjacent image blocks,
  calculating vertical distortion ratios of vertically adjacent image blocks based on a gray value difference between each of a plurality of pairs of pixels in the vertically adjacent image blocks that face each other at a boundary between the vertically adjacent image blocks and a gray value difference between each of a plurality of remaining pairs of vertically adjacent pixels in the vertically adjacent image blocks that do not face each other at the boundary between the vertically adjacent image blocks,
  setting horizontal compensation parameters and vertical compensation parameters based on the calculated horizontal and vertical distortion ratios, and
  calculating distortion compensation values of the vertically adjacent image blocks and the horizontally adjacent image blocks by multiplying specific values by the set horizontal and vertical compensation parameters, the specific values obtained by substituting the respective vertical and horizontal gray value differences into a dissipation function; and
  compensating the vertically adjacent image blocks and the horizontally adjacent image blocks according to the calculated distortion compensation values.

16. The method according to claim 15, wherein the step of calculating the horizontal distortion ratios includes:
  calculating the horizontal distortion ratios based on a ratio of the gray value difference between each of the pairs of pixels in the horizontally adjacent image blocks at the boundary between the horizontally adjacent image blocks to an average gray value difference between the remaining pairs of horizontally adjacent pixels in the horizontally adjacent image blocks.

17. The method according to claim 15, wherein the step of calculating the vertical distortion ratios includes:
  calculating the vertical distortion ratios based on a ratio of the gray value difference between each of the pairs of pixels in the vertically adjacent image blocks at the boundary between the vertically adjacent image blocks to an average gray value difference between the remaining pairs of vertically adjacent pixels in the vertically adjacent image blocks.

18. The method according to claim 15, wherein the step of setting the horizontal compensation parameters and the vertical compensation parameters based on the calculated horizontal and vertical distortion ratios includes:
  setting a range of pixels for compensation, included in the vertically adjacent image blocks and the horizontally adjacent image blocks, based on the calculated horizontal and vertical block distortion ratios.

19. The method according to claim 15, wherein the step of setting the horizontal compensation parameters and the vertical compensation parameters based on the calculated horizontal and vertical distortion ratios includes:
  setting a compensation proportion of each of a plurality of pixels included in the vertically adjacent image blocks and the horizontally adjacent image blocks according to the calculated horizontal and vertical block distortion ratios and a distance from the respective boundaries between the vertically adjacent image blocks and the horizontally adjacent image blocks to each of the pixels.

20. The method according to claim 15, wherein the step of compensating the vertically adjacent image blocks and the horizontally adjacent image blocks according to the calculated distortion compensation values includes:
  detecting pixels corresponding to an object edge and a caption portion,
  wherein the calculated distortion values are not applied to the pixels corresponding to the object edge and the caption portion.

21. An apparatus for compensating images in a display device, the apparatus comprising:
  a decoder configured to decode an incoming image signal;
  a memory connected to the decoder and arranged to store the decoded image signal as image blocks;
  a distortion detector connected to the memory and configured to form a process window that overlaps with at least a subset of the image blocks,
    calculate horizontal distortion ratios of horizontally adjacent image blocks based on a gray value difference between each of a plurality of pairs of pixels in the process window that face each other at a boundary between the horizontally adjacent image blocks and a gray value difference between each of a plurality of remaining pairs of horizontally adjacent pixels in the horizontally adjacent image blocks that do not face each other at the boundary between the horizontally adjacent image blocks, and
    calculate vertical distortion ratios of vertically adjacent image blocks based on a gray value difference between each of a plurality of pairs of pixels in the vertically adjacent image blocks that face each other at a boundary between the vertically adjacent image blocks and a gray value difference between each of a plurality of remaining pairs of vertically adjacent pixels in the vertically adjacent image blocks that do not face each other at the boundary between the vertically adjacent image blocks;
  a distortion compensator connected to the distortion detector and configured to set horizontal compensation parameters and vertical compensation parameters based on the calculated horizontal and vertical distortion ratios, and to calculate corresponding distortion compensation values of the vertically adjacent image blocks and the horizontally adjacent image blocks by multiplying specific values by the set horizontal and vertical compensation parameters, the specific values obtained by substituting the respective vertical and horizontal gray value differences into a dissipation function; and
  an image processor connected to the memory and the distortion compensator, the image processor configured to process the stored decoded image signal by compensating the vertically adjacent image blocks and the horizontally adjacent image blocks according to the calculated distortion compensation values.

22. The apparatus according to claim 21, wherein the distortion detector is configured to calculate the horizontal distortion ratios based on a ratio of the gray value difference between each of the pairs of pixels in the horizontally adjacent image blocks at the boundary between the horizontally adjacent image blocks to an average gray value difference between the remaining pairs of horizontally adjacent pixels in the horizontally adjacent image blocks.

23. The apparatus according to claim 21, wherein the distortion detector is configured to calculate the vertical distortion ratios based on a ratio of the gray value difference between each of the pairs of pixels in the vertically adjacent image blocks at the boundary between the vertically adjacent image blocks to an average gray value difference between the remaining pairs of vertically adjacent pixels in the vertically adjacent image blocks.

24. The apparatus according to claim 21, wherein the distortion compensator is configured to set a range of pixels for compensation, included in the vertically adjacent image blocks and the horizontally adjacent image blocks, based on the calculated horizontal and vertical block distortion ratios.

25. The apparatus according to claim 21, wherein the distortion compensator is configured to set a compensation proportion of each of a plurality of pixels included in the vertically adjacent image blocks and the horizontally adjacent image blocks according to the calculated horizontal and vertical block distortion ratios and a distance from the respective boundaries between the vertically adjacent image blocks and the horizontally adjacent image blocks to each of the pixels.

26. The apparatus according to claim 21, wherein the distortion compensator is configured to detect pixels corresponding to an object edge and a caption portion and to not output the calculated distortion values for the pixels corresponding to the object edge and the caption portion.

* * * * *